Aug. 30, 1960 P. E. YOST 2,950,882
BALLOON GONDOLA
Filed April 16, 1956
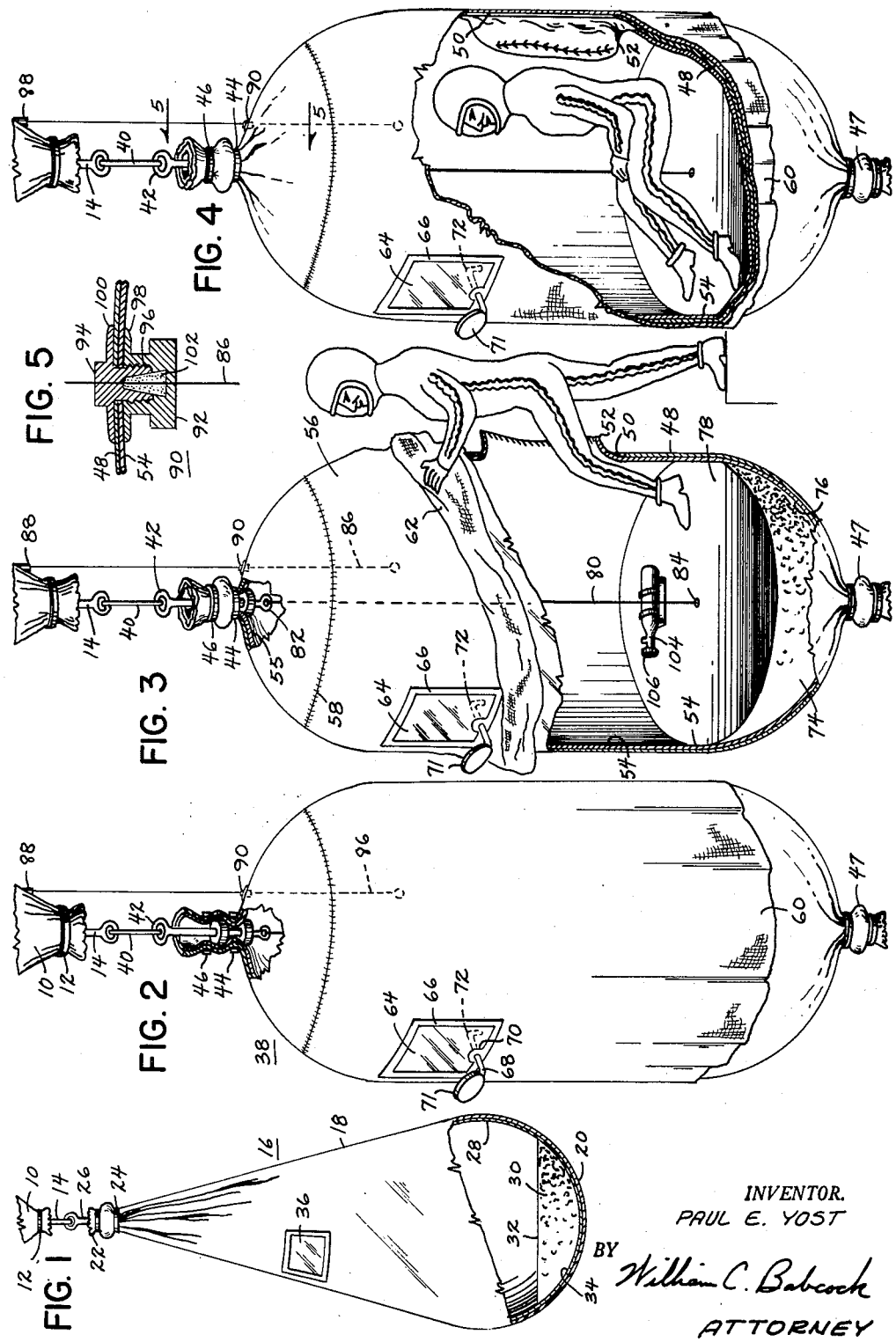
INVENTOR.
PAUL E. YOST
BY William C. Babcock
ATTORNEY

United States Patent Office 2,950,882
Patented Aug. 30, 1960

2,950,882

BALLOON GONDOLA

Paul E. Yost, Hugo, Minn., assignor to General Mills, Inc., a corporation of Delaware Filed Apr. 16, 1956, Ser. No. 578,531

14 Claims. (Cl. 244—31)

The present invention relates to balloons and particularly to a balloon gondola assembly for manned flights.

Passenger carrying balloons have been used in the past for flights at various altitudes. In some cases the maximum altitudes for such flights have been limited by the nature of the gondola construction, particularly its weight, and in some cases by the absence of a suitable enclosure for the passenger.

It is one object of the present invention to provide an improved gondola construction for manned balloon flights.

It is a further object to provide a balloon gondola assembly in which a flexible bag of lightweight construction substantially encloses the passenger.

A further object is a balloon gondola in which the flexible material of a lightweight bag or passenger compartment also serves to support the weight of the passenger.

Other objects and advantages of the invention will be apparent from the following specification, in which certain preferred embodiments of the invention are disclosed with particular reference to the accompanying drawings.

In the drawings:

Figure 1 is a partial side elevation, with certain portions broken away, of a simplified balloon gondola assembly according to the present invention;

Fig. 2 is a view similar to Fig. 1 of a further embodiment of the invention;

Fig. 3 is a view similar to Fig. 2 showing the manner in which a passenger enters or leaves the gondola;

Fig. 4 is a view similar to Figs. 2 and 3 after the passenger has entered the gondola and the entrance opening has been closed; and Fig. 5 is an enlarged sectional view on the line 5—5 of Fig. 4.

As shown in Fig. 1, one embodiment of the present invention which is relatively simple and economical of construction is designed to provide a gondola assembly for attachment to a high altitude balloon, the bottom portion of which is shown at 10. Since the balloon or lifting cell may be of any desired construction to provide the desired lifting forces, its details will not be described. Such balloons are known, however, in which the body of the balloon is made of lightweight plastic sheet material which is gathered together at its lower end by a suitable fitting as shown at 12. The fitting serves both to close the lower end of the balloon and to provide a load-carrying member 14 for attachment to the desired load.

In this case, the load consists of a gondola assembly 16 which is essentially in the form of a bag 18 made of flexible fabric having a closed bottom end 20. The upper end of the bag at 22 is gathered together and secured by a fitting 24. Fitting 24 not only closes and holds the upper end of the gondola bag 18, but also includes a load shaft 26 by which the upper end of the gondola bag or shell is secured to the load member 14 of the lifting cell. While various types of fittings may be used to close the upper end of bag 18 and secure it to the balloon, one type of fitting suitable for this purpose is disclosed in my copending application Serial No. 572,894, filed March 21, 1956, entitled "Balloon Load Attachment Fitting."

The material from which the bag or shell 18 is constructed is preferably a heavy fabric material which not only has the strength necessary to support the weight of the passenger or other load within the bag, but also has sufficient resistance to abrasion to prevent damage during launching and landing of the balloon. One suitable material for this purpose is nylon fabric.

In order to protect a pilot or passenger located within the bag and permit him to maintain the desired atmospheric condition within the bag, which might differ from the atmospheric conditions outside the bag at flying altitudes, the gondola also includes an inner bag or liner of substantially leak-proof material as shown at 28. This inner liner preferably corresponds substantially to the shape of the interior of the bag and its upper end may be closed and secured by the same fitting 24, 26 used to secure the upper end of the outer bag. One material suitable for construction of this inner bag is polyethylene, of which a double layer of substantially four mils thickness for each layer is recommended.

To support the desired human passenger within the bag, a suitable block or platform 30 is provided. This platform includes a substantially flat upper surface 32 on which the passenger may stand or sit. The lower surface 34 of this supporting platform 30 is provided with a contour tailored to fit the bottom of the bag, when the bag is pressurized as discussed below.

The outer diameter of the supporting platform 30, and the tailored shape of the bottom 34 provide for support of the platform by the bag walls, and also assist in maintaining the bag walls in extended or spaced relation to provide the desired inner chamber to receive a passenger. While various materials may be used for the support 30, I prefer to use balsa wood or some form of plastic foam block construction. Such materials are not only substantially non-metallic, but also extremely light in weight.

In order that the pilot may have adequate visibility of his surroundings, one or more transparent windows 36 may be provided. Such a window is suitably secured in appropriate registering openings in the outer bag and inner liner, by a gastight frame or fitting of known construction.

In this embodiment of the invention, it is contemplated that the passenger will enter the bag through the top opening, before the latter is closed and secured by fitting 24. Since this will be done at ground level, the bag will also contain air at normal atmospheric pressure. If the bag and liner are sufficiently gastight, this pressure will be maintained during flight to assist in holding the bag walls extended and to provide greater comfort for the pilot.

If desired, an auxiliary pressurizing unit may also be included, as set forth in connection with the other embodiment described below, to maintain the desired pressure in case of leakage. A separate source of oxygen for breathing, and possibly a pressurized suit for emergency use, may also be carried by the pilot for flights at altitudes which require such items.

It will be apparent from the above description that the gondola of Fig. 1 involves a construction in which the supporting member or platform for the pilot is supported by the fabric material of the gondola shell itself. The absence of metallic parts makes the overall gondola construction a poor radar target. At the same time, the fabric construction of the shell permits the passenger or pilot to escape readily in emergencies by merely cutting the gondola shell with a knife. The construction is light in weight and relatively simple and inexpensive to construct.

With reference to the embodiment shown in Figs. 2, 3, and 4, a preferred arrangement of the parts is disclosed. Here the lifting cell 10 and its closure and load attachment fitting portions 12 and 14 are identical to the corresponding parts illustrated in Fig. 1. In this case the gondola assembly, indicated generally at 38 is suspended from the load member 14 by a connecting bar or ring 40. The lower end of this connecting member is secured to the load shaft or eye bolt 42 of a fitting having clamping bands 44 and 46 to close and secure the upper end of the gondola. This fitting is of the type described in the above copending application.

In this case, the main body portion of the gondola 38 includes a tubular or cylindrical section 48 of strong flexible material, such as the nylon fabric described above. The upper end of this tubular section 48 is secured by fitting 42, 44, 46 as described, while the lower end of the tube is closed by a similar fitting at 47. Thus the bottom of this flexible gondola is closed and formed by the fitting 47 rather than by the use of an integral bag bottom as in the device of Fig. 1.

To provide for entrance and exit of the pilot or passenger, the tubular side wall of the body portion 48 is provided with an entrance opening 50. Preferably this opening is in the form of a slit, which extends vertically of the fabric, but does not remove any of the width of the fabric. This opening 50 is adapted to receive the projecting neck or entrance portion 52 of a suitable inner lining member 54, to facilitate entrance and exit of the passenger. The inner liner 54 is made of flexible gastight material, such as polyethylene. The liner 54 includes a tubular body portion which just fits within the main flexible shell 48. The upper end 55 of this tubular inner liner may be gathered together and secured in the same fitting 42, 44, 46 which holds the main fabric shell 48. The lower end of the inner lining tube is similarly gathered and secured by the bottom fitting 47. Thus the inner liner is substantially coextensive with the main fabric shell and insures a gasproof compartment for the passenger.

According to another feature of the present invention, the gondola assembly also includes an outer protective fabric tube 56. This protective fabric tube is adapted to fit closely around the exterior of the flexible shell portion 48, particularly throughout the vertical region coextensive with entrance opening 50. The upper end of this tubular outer fabric layer is secured at 58 to the upper portion of the shell 48. The lower edge 60 of the outer fabric tube then hangs downwardly free of attachment to the shell 48.

This depending edge of the outer tube may be rolled upwardly as shown at 62 in Fig. 3 to a point above the opening 50 during entrance or exit of the passenger. Once the passenger is in position as shown in Fig. 4, the entrance tube 52 of the inner liner is retracted out of opening 50 to a point within the shell 48 and the outer tube is released so that it hangs downwardly to cover fully the opening 50. Thus the outer tubular fabric section can absorb any circumferential stresses which might be imposed on the gondola assembly and prevent inadvertent opening or tearing of the shell portion 48 adjacent opening 50.

For the convenience of the passenger, a suitable viewing window is provided at 64. This viewing window may be of transparent plastic secured by frame portion 66 to the edges of registering openings in the inner liner 54, main fabric shell 48, and outer protective tube 56. The window is preferably located at a position which will not interfere with manipulation of the outer tube during entrance or exit of the passenger. Thus the window is illustrated at a location higher on the gondola structure than the opening 50, but below the line of attachment 58 of the outer layer.

A suitable shaft 68 carries a viewing mirror 71 to assist the operator in seeing areas above or below the gondola. The supporting shaft 68 passes through a suitable gastight bearing 70 which may be associated with the viewing window frame 66. The inner end 72 of the shaft 68 provides means for convenient manipulation of the shaft and mirror by the passenger to achieve the desired angle of view. The mirror 71 is supported on shaft 68 so that its plane makes an angle of substantially 45 degrees with the axis of the shaft 68 to provide maximum viewing coverage in all directions as shaft 68 is rotated.

To support the passenger within the gondola a suitable platform 74 is provided. This platform is similar to that shown in the embodiment of Fig. 1 and includes a contour on its lower surface 76 which is tailored to fit the natural shape of the gondola bottom, as closed by fitting 47, when the shell is pressurized. A flat upper surface 78 on platform 74 provides space for the passenger to sit or stand.

In this embodiment of the invention a reinforcing member 80 is interconnected between the top and bottom of the fabric gondola. Specifically, member 80 consists of a load-bearing wire which is secured at 82 to the shaft 42 of the upper fitting. The lower end of the wire passes freely through an opening 84 in the plastic foam supporting platform and is similarly secured to the lower fitting 47. Thus the wire cooperates with the flexible fabric walls of the bag to carry a part of the load imposed by the support platform 74. A substantial portion of the weight of this platform and its contents must, however, necessarily be borne by the fabric walls of the shell portion 48.

In order to permit the operator to control the ascent or descent of the balloon, a suitable control wire 86 is passed from the interior of the gondola to an appropriate point on the lifting cell at 88. To preserve the gastight nature of the gondola wall, this control wire 86 passes through a suitable fitting shown in detail at 90 in Fig. 5. The fitting includes an inner member 92 and a cooperating outer member 94 interconnected by threads 96. Appropriate flanges 98 and 100 on the respective inner and outer members engage and clamp the fabric wall 48 and inner liner 54 in gastight relation. Control wire 86 passes through the inner and outer clamping portions and through a graphite packing 102 which is compressed by the clamps. Wire 86 may, for example, be connected to a valve or rip panel to control the descent of the balloon.

Because the gondola will be loaded at ground level, it will contain air at atmospheric pressure for that level. As the balloon ascends to higher altitudes, the external pressure decreases, while the original pressure is maintained inside the shell to an extent determined by the efficiency of the closures and the leakage characteristics, if any, of the shell and liner materials.

An auxiliary source of compressed air or other gas is supported inside the gondola as shown at 104. A manually operable control handle 106 can be adjusted by the pilot to maintain or increase the desired pressure inside the shell. This pressurized atmosphere provides greater comfort for the pilot. As an extra safety measure, the pilot may also wear a self-contained pressurized suit and helmet as shown, with his own portable oxygen supply (not shown) for breathing.

The gondola construction just described in connection with Figs. 2 to 4 provides a multiple layer flexible shell which serves both to enclose a passenger and to carry substantial portions of the weight of the passenger and his supporting platform. The main layer of fabric at 48 carries these vertical stresses and loads, while the inner liner 54 provides the desired gastight arrangement, and the outer layer 56 adds strength and protection in circumferential directions.

For the fabric material of the main tubular body portion, various grades of nylon fabric are preferred, because of the flexibility, strength, and light weight of these materials. Nylon fabric is available in a variety of strengths up to 1,000 lbs. per inch of width.

As a specific example of the construction of a suitable gondola according to this example, assume the diameter of the cylindrical portion 48 of the gondola of Figs. 2–4 is 48 inches. If an internal pressure of substantially 4 pounds per square inch (p.s.i.) is desired, the fabric tensile strength needed to resist circumferential stresses due to such pressure, with a safety factor of 4, would be substantially 384 lbs. per inch. The gondola shell made of such fabric can then support substantial loads including a pilot, with normal instrument installations, totaling 400 to 500 lbs. or more with a high safety factor.

The embodiments of the invention described above substantially meet the objectives set forth in the beginning of this application and provide an improved gondola assembly construction for manned balloon flight. Since many variations and changes in the exact details of construction will be apparent to persons skilled in this field, it is intended that this invention shall cover all such changes and modifications as fall within the spirit and scope of the foregoing description and the attached claims.

Now therefore I claim:

1. A balloon gondola assembly for maintaining an atmosphere for manned flight comprising a flexible bag having a size, shape and strength providing a compartment for a human passenger, means for attaching the top of said bag to a lifting cell, said means bearing the weight of said flexible bag and a passenger support member located inside said bag, a substantial portion of the weight of said support member and of a passenger on said support member being sustained by the walls of said flexible bag.

2. A balloon gondola assembly according to claim 1 including means for pressurizing the interior of said bag.

3. A balloon gondola assembly comprising a fabric bag having a size, shape and strength providing a flexible passenger-containing shell, said bag having an entrance opening in its side wall, and an outer shell of protective fabric adapted to enclose said fabric bag and resist circumferential stresses in at least the area of said entrance opening.

4. A balloon gondola according to claim 3 in which said entrance opening is in the form of a vertical slit.

5. A balloon gondola assembly according to claim 3 having a separate gastight flexible inner liner provided with an entrance neck portion adapted to register with said bag opening for entrance of a passenger, and adapted to be retracted and closed within said bag after the passenger is in position.

6. A balloon gondola assembly for maintaining an atmosphere for manned flight comprising a flexible bag adapted to provide a passenger compartment, means for attaching the top of said bag to a lifting cell, and a passenger support located inside said bag, said passenger support having a bottom surface contour which is tailored to fit the natural curvature of the bag bottom, the width of said support assisting in maintaining the bag walls extended to provide space for the passenger, and the weight of said passenger being supported solely by the walls of said bag.

7. A balloon gondola assembly for maintaining an atmosphere for manned flight comprising a flexible bag adapted to provide a passenger compartment, means for attaching the top of said bag to a lifting cell, a passenger support located inside said bag, a substantial portion of the weight of said support being sustained by the walls of said flexible bag, and a reinforcing member interconnecting the top and bottom of the bag and cooperating with the walls of said bag to carry part of the load within said bag.

8. A balloon gondola assembly comprising a fabric bag adapted to provide a flexible passenger-containing shell, said bag having an entrance opening in its side wall, an outer shell of protective fabric adapted to enclose said fabric bag and resist circumferential stresses in at least the area of said entrance opening, said outer protective fabric being in the form of a tube having its top edge secured with respect to the flexible fabric bag at a point above said entrance opening and having its bottom edge adapted to extend substantially below said opening after the passenger is in position, said bottom edge being free of attachment to the bag and adapted to be lifted above said opening during entrance and exit of the passenger, and a separate gastight flexible inner liner provided with an entrance neck portion adapted to register with said bag opening for entrance of a passenger, and adapted to be retracted and closed within said bag after the passenger is in position.

9. A balloon gondola assembly according to claim 8 in which said fabric bag, inner liner, and outer protective fabric tube include registering openings, and a viewing window secured to provide a transparent closure for said registering openings, said window and registering openings being located on the gondola at a level above said entrance opening, but below the secured top edge of said outer protective fabric.

10. A balloon gondola assembly for high altitude manned flight comprising a flexible fabric shell adapted to provide a passenger compartment, said shell comprising a generally vertical tubular section of said fabric, attachment means at the top of said tubular section for gathering and securing the upper end of the tube to form a closure and providing means for connection of said upper end to a lifting cell, means at the bottom of said tubular section for gathering and securing the lower portion of said tubular portion and thereby providing a closed bottom for said shell, and a passenger supporting platform located inside said shell and having a bottom surface contour tailored to fit the natural curvature of the shell bottom as closed by said bottom securing means, said supporting platform being supported by the flexible fabric walls of said shell.

11. A balloon gondola assembly according to claim 10 in which said shell comprises heavy nylon fabric and in which said supporting platform has a generally circular upper surface adapted to fit the inside diameter of the tubular shell portion and thereby maintain said shell walls in extended position to enclose the passenger.

12. A balloon gondola assembly according to claim 10 in which said tubular shell portion includes an entrance opening in the form of a vertical slit in one side of the tubular section, a separate inner gastight liner substantially coextensive with said fabric shell and closed at the top and bottom, said inner liner having an entrance neck portion adapted to project through the shell opening for entrance and exit of a passenger, and adapted to be retracted within said shell after the passenger is in position within the shell, and an outer protective fabric tube adapted to fit closely around the outside of said flexible shell and absorb circumferential stresses in at least the area of said shell opening, said outer protective tube having an upper edge secured to the shell above said shell opening and having a bottom edge adapted to be lifted above said opening during entrance and exit of the passenger.

13. A balloon gondola assembly according to claim 12 including a reinforcing wire interconnecting the securing and closing means at the top and bottom of the bag and thereby cooperating with the bag walls to carry part of the weight of said platform.

14. A balloon gondola assembly for maintaining an atmosphere for manned flight comprising a flexible bag having a size, shape and strength providing a compartment for a human passenger, means for attaching the top of said bag to a lifting cell, said means bearing the weight of said flexible bag, and means comprising a passenger support member located inside said bag, the weight of said support member being supported solely by the walls of said bag.

References Cited in the file of this patent

UNITED STATES PATENTS 2,455,248    Hagen et al.            Nov. 30, 1948

FOREIGN PATENTS 546,997    Germany               Mar. 17, 1932
740,158    Great Britain           Nov. 9, 1955